United States Patent
Toni (10) Patent No.: US 10,903,739 B2
(45) Date of Patent: Jan. 26, 2021

(54) CAPACITOR CROSS COUPLED 2-PHASE BUCK CONVERTER

(71) Applicant: Arnaud Toni, San Diego, CA (US)

(72) Inventor: Arnaud Toni, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

(21) Appl. No.: 16/570,933

(22) Filed: Sep. 13, 2019

(65) Prior Publication Data

US 2020/0091818 A1    Mar. 19, 2020

Related U.S. Application Data

(60) Provisional application No. 62/731,659, filed on Sep. 14, 2018.

(51) Int. Cl.
*H02M 3/07* (2006.01)

(52) U.S. Cl.
CPC ..................... *H02M 3/07* (2013.01)

(58) Field of Classification Search
CPC ........................................ H02M 3/07
See application file for complete search history.

(56) References Cited

U.S. PATENT DOCUMENTS

| | | | | |
|---|---|---|---|---|
| 5,461,557 | A * | 10/1995 | Tamagawa | H02M 3/18 363/59 |
| 9,793,799 | B1 | 10/2017 | Babazadeh et al. | |
| 10,141,849 | B1 * | 11/2018 | Jiang | H02M 3/1584 |
| 2011/0260537 | A1 * | 10/2011 | Tang | H02M 3/1584 307/55 |
| 2012/0105040 | A1 * | 5/2012 | Leipold | H02M 3/1584 323/284 |
| 2016/0187386 | A1 | 6/2016 | El-Damak et al. | |
| 2018/0026526 | A1 | 1/2018 | Ahmed et al. | |

FOREIGN PATENT DOCUMENTS

| | | |
|---|---|---|
| EP | 0655826 A1 | 5/1995 |
| JP | 2018-508177 A | 3/2018 |

OTHER PUBLICATIONS

International Search Report on related PCT Application No. PCT/IB2019/057756 from International Searching Authority (KIPO) dated Jan. 15, 2020.

Written Opinion on related PCT Application No. PCT/IB2019/057756 from International Searching Authority (KIPO) dated Jan. 15, 2020.

* cited by examiner

*Primary Examiner* — Jue Zhang
*Assistant Examiner* — Trinh Q Dang
(74) *Attorney, Agent, or Firm* — Klein, O'Neill & Singh, LLP (57) ABSTRACT

A buck converter uses flying capacitors and cross coupling. The flying capacitors reduce the voltage stress across the inductors and the devices, and may provide high efficiency at very low duty cycle ratios. In addition to the high efficiency performance, the converters may provide a significant reduction in area, since smaller inductors can be used compared to typical buck converters. An example of realization shows up to 90% efficiency at 0.5V output and 10 A load from a 3.6V input with small flying capacitors, compared to what is typically used in a switched capacitor converter.

13 Claims, 10 Drawing Sheets

CAPACITOR CROSS COUPLED 2-PHASE BUCK CONVERTER

CROSS REFERENCE TO RELATED APPLICATION

This application claims the benefit of the filing date of U.S. Provisional Patent Application No. 62/731,659, filed on Sep. 14, 2018, the disclosure of which is incorporated by reference herein.

BACKGROUND

The present invention relates generally to voltage regulators, and more particularly to a multiphase buck converter with capacitor cross coupling.

Figure 1:
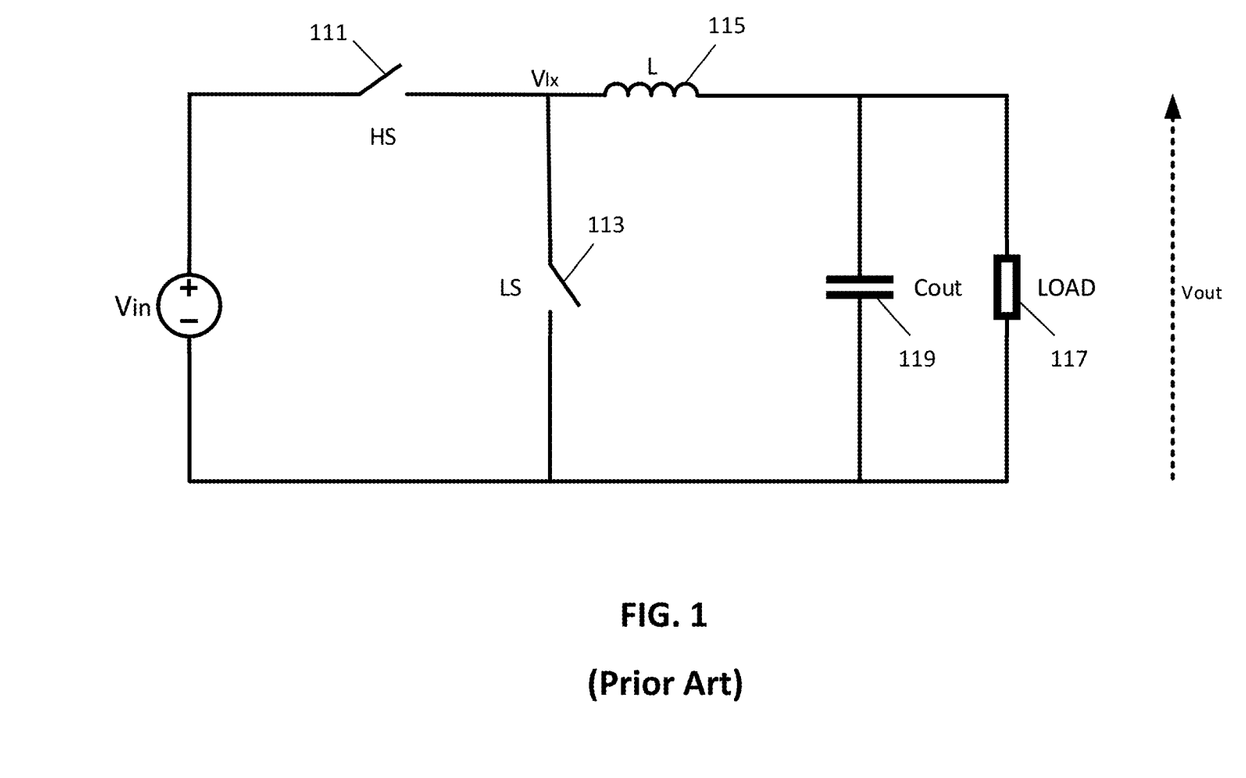
FIG. 1 shows the basic structure of a buck converter.
Figure 2:
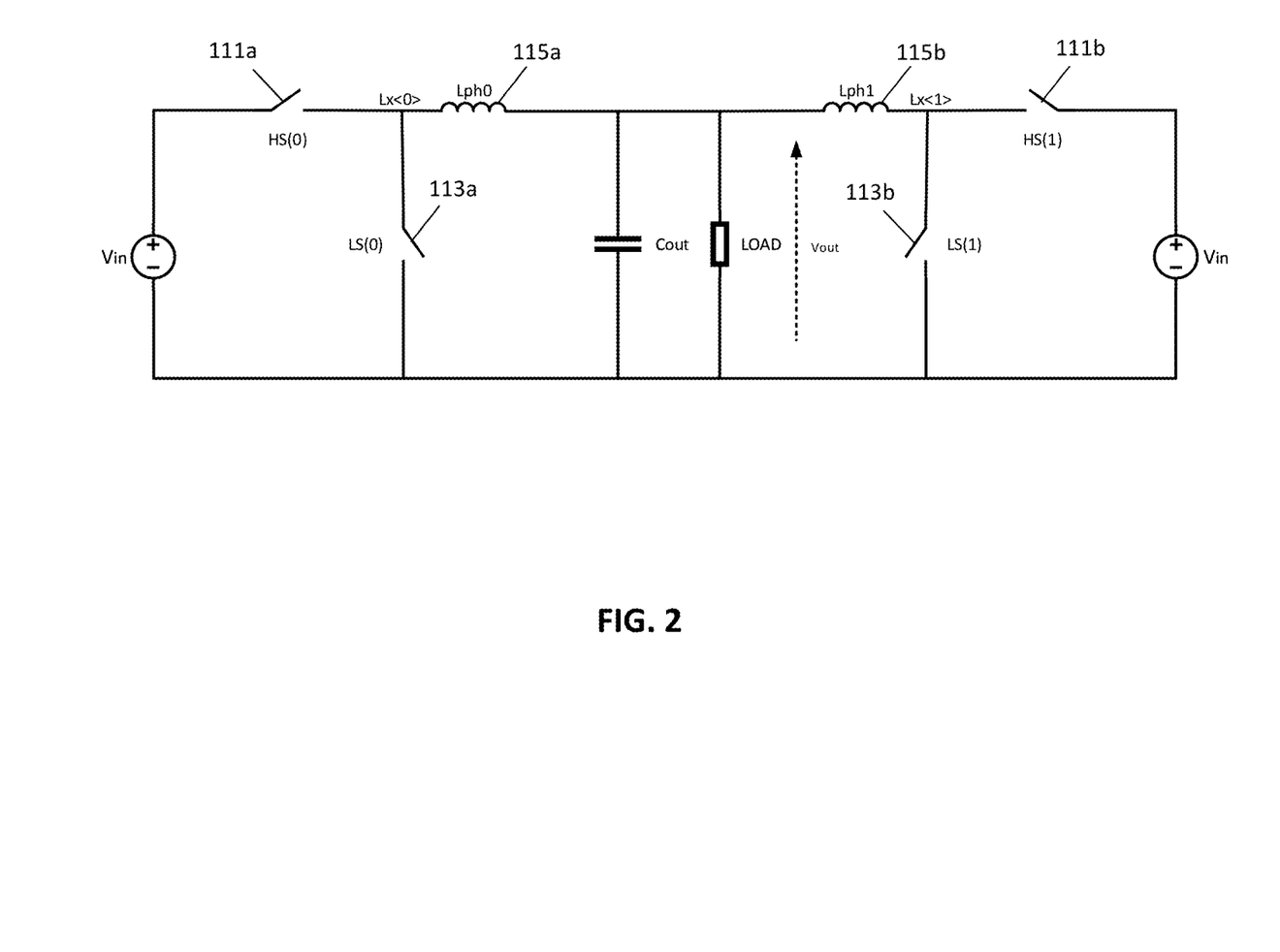
FIG. 2 shows the basic configuration of a typical 2 phase buck converter.

A buck converter is a step-down voltage regulator used to provide current to a load, for example one or more processors. A basic topology of a buck converter, for example as illustrated in FIG. 1, comprises a high side switch 111 (usually a PMOS) and a low side switch 113 (usually a NMOS), which switch an input end of an inductor 115 between supply and ground to regulate an output voltage to a predetermined value. As the inductor supplies current to a load 117, a decoupling capacitor 119 Cout is used in parallel to the load in order to maintain a generally constant voltage. Multiple buck converters can be used in parallel and share the same output. Often the switches of the different buck converters are operated at different phases, and the converter is considered a multiphase converter. FIG. 2 shows an example of a 2 phase buck converter, in which two power stages (high side switches 111a,b and low side switches 113a,b) and inductors 115a,b are used. The gates of the switches are clocked with a 180-degree phase shift, which generally reduces ripple at the output. The use of multiple phases also improves the overall efficiency since less current is used per phase.

For a buck converter the following points are generally preferred: a) high efficiency for high step-down since the targeted SoC supply voltages are very low; b) less area consumption which can be achieved by less voltage stress across the inductor, so small inductors can be used; and c) fewer switches for lower area consumption as well as to allow for fast switching.

The chase for high density of integration has led to solutions of hybrid converters such as multi-output switched capacitors having topologies that use a switched capacitor with a buck converter in cascade and three level buck converters which are based on switched capacitor regulators.

Multi-output switched capacitors having topologies that use a switched capacitor with a buck converter in cascade may reduce voltage stress across the inductor, allowing for use of smaller inductors, and may also provide overall high efficiency by prioritizing a very efficient switched capacitor running at low frequency. Since capacitors have higher density of integration, they may be appropriate for reducing the total used area. Although this type of converter may provide high efficiency for high step down and fast switching, they use many switches, increasing the total die area and, even though smaller inductors can be used, there is generally a need for use of large capacitors for the front end switched capacitor.

Three level buck converters which are based on switched capacitor regulators may provide high efficiency as the duty cycle gets closer to 50%, but the inductor can still be stressed with the full input voltage range.

BRIEF SUMMARY OF THE INVENTION

Some embodiments provide a capacitor cross coupled 2-phase buck converter. The converter may have 2 identical phases, with each phase comprised of a high side switch HS, a low side switch LS and a cross side switch CS. The topology may maintain a constant voltage Vin/2 across each flying capacitor (Cfly0, Cfly1), thus limiting the input voltage to the inductor to Vin/2. For each phase, the inductor may take a certain amount of charge $Q=\int_0^{ton} i_L \, dt$ from a different plate of each flying capacitor. Switching between Vin and ground, Cfly0 and Cfly1 may keep a constant Vin/2 as voltage between their plates.

Some embodiments provide a multi-phase buck converter, comprising: a plurality of power conversion phases, each power conversion phase comprising a high side switch and a low side switch coupled in series between an input voltage and a lower voltage, a flying capacitor coupled between the high side switch and the low side switch, and an inductor having a first end coupled to a node between the low side switch and the flying capacitor, with a second end of the inductor coupled to a load and an output capacitor in parallel; and a plurality of cross-coupling switches, each cross coupling switch coupling a node between the high side switch and the flying capacitor of one phase to the node between the low side switch and the flying capacitor of another phase.

Some embodiments provide a method of operating a multi-phase buck converter having a plurality of power conversion phases, each of the power conversion phases having a flying capacitor in series between a high side switch and a low side switch, with an inductor having a first end coupled to a node between the flying capacitor and the low side switch and having a second end coupled to a load in parallel to an output capacitor, the method comprising: during one time period, coupling the first end of the inductor of one phase with a node between the high side switch and the flying capacitor of another phase; and during another time period, not coupling the first end of the inductor of one phase with the node between the high side switch and the flying capacitor of the other phase. Some such embodiments further provide for, during the other time period, coupling the first end of the inductor of the other phase with a node between the high side switch and the flying capacitor of the first phase. In some such embodiments the high side switch of the first phase is closed during the one time period and the high side switch of the other phase is open during the one time period. In some such embodiments the low side switch of the first phase is open during the one time period and the low side switch of the other phase is closed during the one time period. In some such embodiments the high side switch of the other phase is closed during the other time period and the high side switch of the first phase is open during the one time period. In some such embodiments the low side switch of the other phase is open during the one time period and the low side switch of the first phase is closed during the one time period. Some such embodiments further provide for during yet another time period, not coupling the first end of the inductor of one phase with the node between the high side switch and the flying capacitor of the other phase and not coupling the first end of the inductor of the other phase with the node between the high side switch and the flying capacitor of the one phase. In some such embodiments the low side switches of the one phase and the other phase are closed during the yet another time period. In some such embodiments the high side switches of the one phase and the other phase are open during the yet another time period.

These and other aspects of the invention are more fully comprehended upon review of this disclosure.

DETAILED DESCRIPTION

Figure 3:
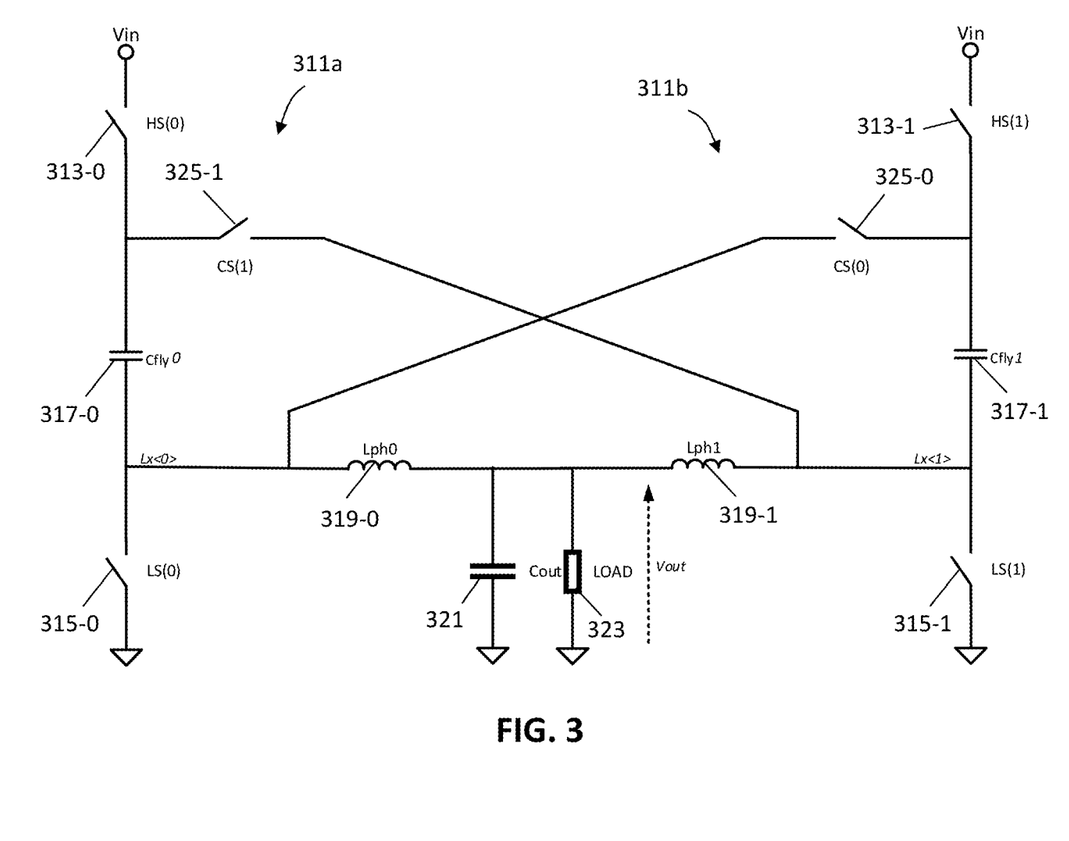
FIG. 3 presents an example of a capacitor cross coupled buck converter in accordance with aspects of the invention.

An example topology of a capacitor cross coupled 2-phase buck converter in accordance with aspects of the invention is shown in FIG. 3. The converter has 2 identical phases 311a,b. Each phase includes a high side switch HS 313-0, 313-1 and a low side switch LS 315-0, 315-1 coupled in series between Vin and ground (or Vss). For each phase, a flyback capacitor 317-0, 317-1 is between the high side switch and the low side switch, with a first end of an inductor 319-0, 319-1 coupled to a node between the flyback capacitor and the low side switch. The first end of the inductors 319-0, 319-1 may be considered an input end of the inductors. A second end of each of the inductors is coupled to an output capacitor 321 and a load 323 in parallel. In addition, for each phase the first end of the inductor is also coupled, by a switch 325-1, 325-0 that may be termed a cross side switch CS to a node between the high side switch and the flyback capacitor of the other phase. During operation, in some embodiments the high side switch of one phase is on (or closed) while the low side switch and cross switch of the other phase is closed, and vice versa. In terms of FIG. 3, during a "high" portion of a phase 0 the switches HS(0) 313-0, LS (1) 315-1, and CS(0) 325-0 are closed and switches HS (1) 313-1, LS(0) 315-0 and CS (1) 325-1 are open, while in a "high" portion of a phase 1 the reverse situation occurs. During a "low" portion of both phases the high side switches and cross switches are all open, while the low side switches are closed.

Figure 5:
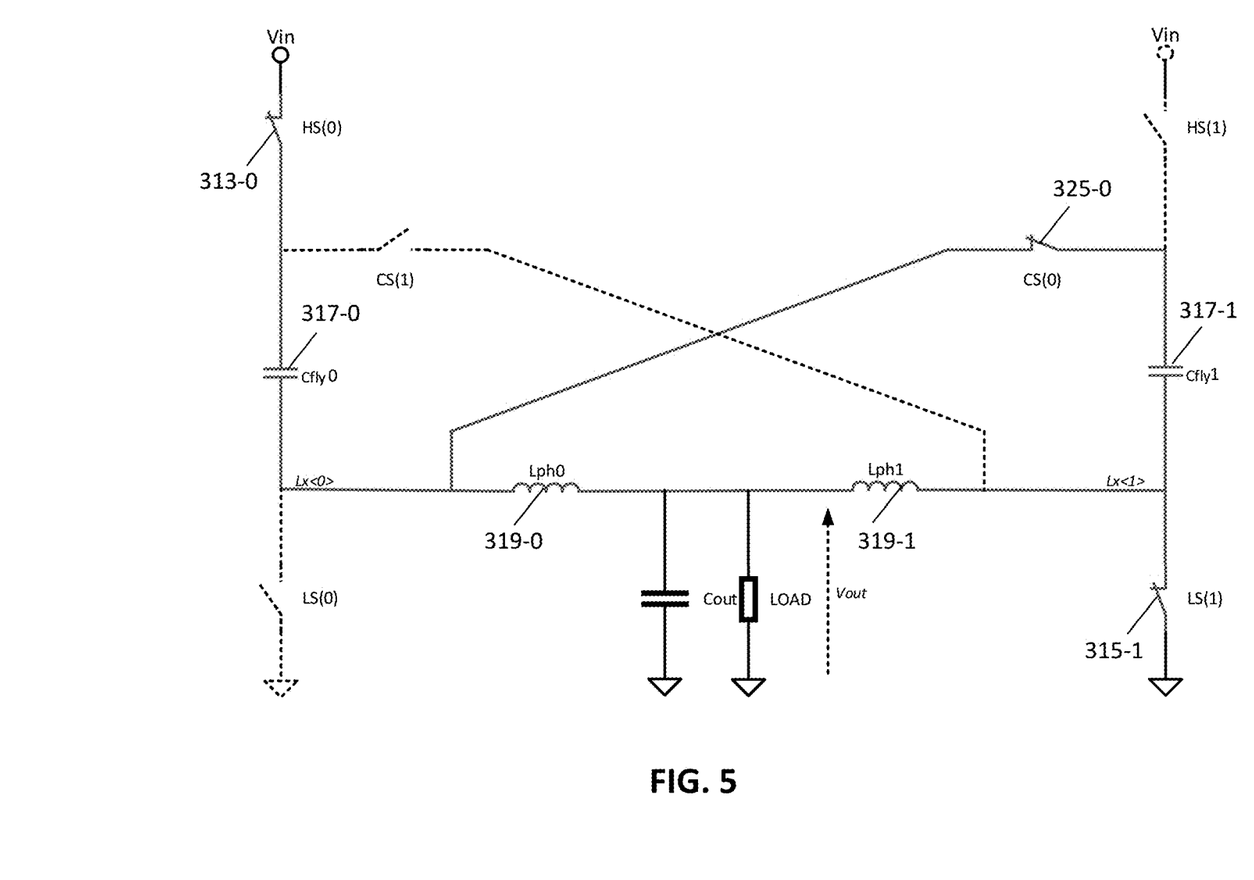
FIGS. 5, 6, and 7 highlight the path of current for each state of the converter of FIG. 3.
Figure 6:
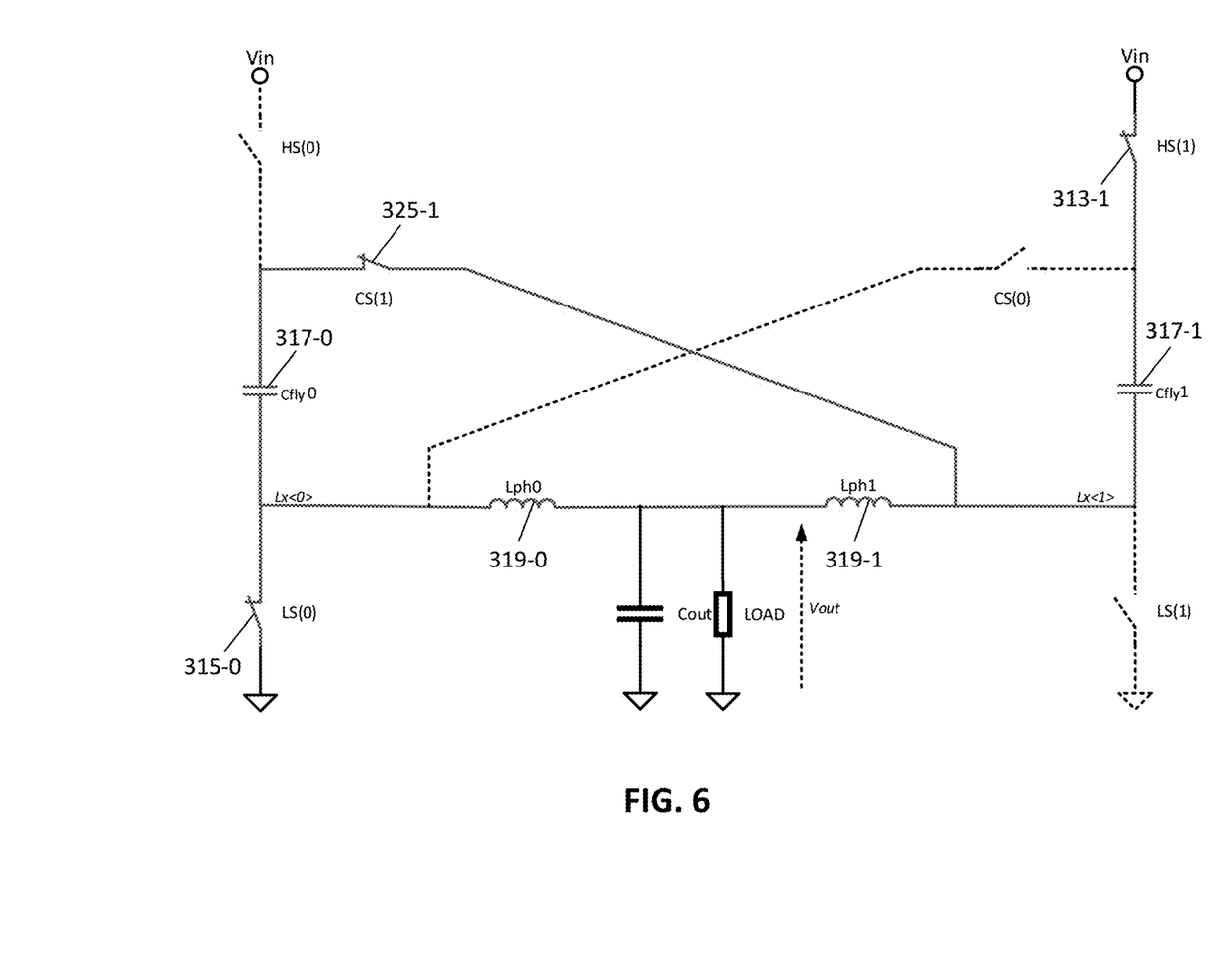
Figure 7:
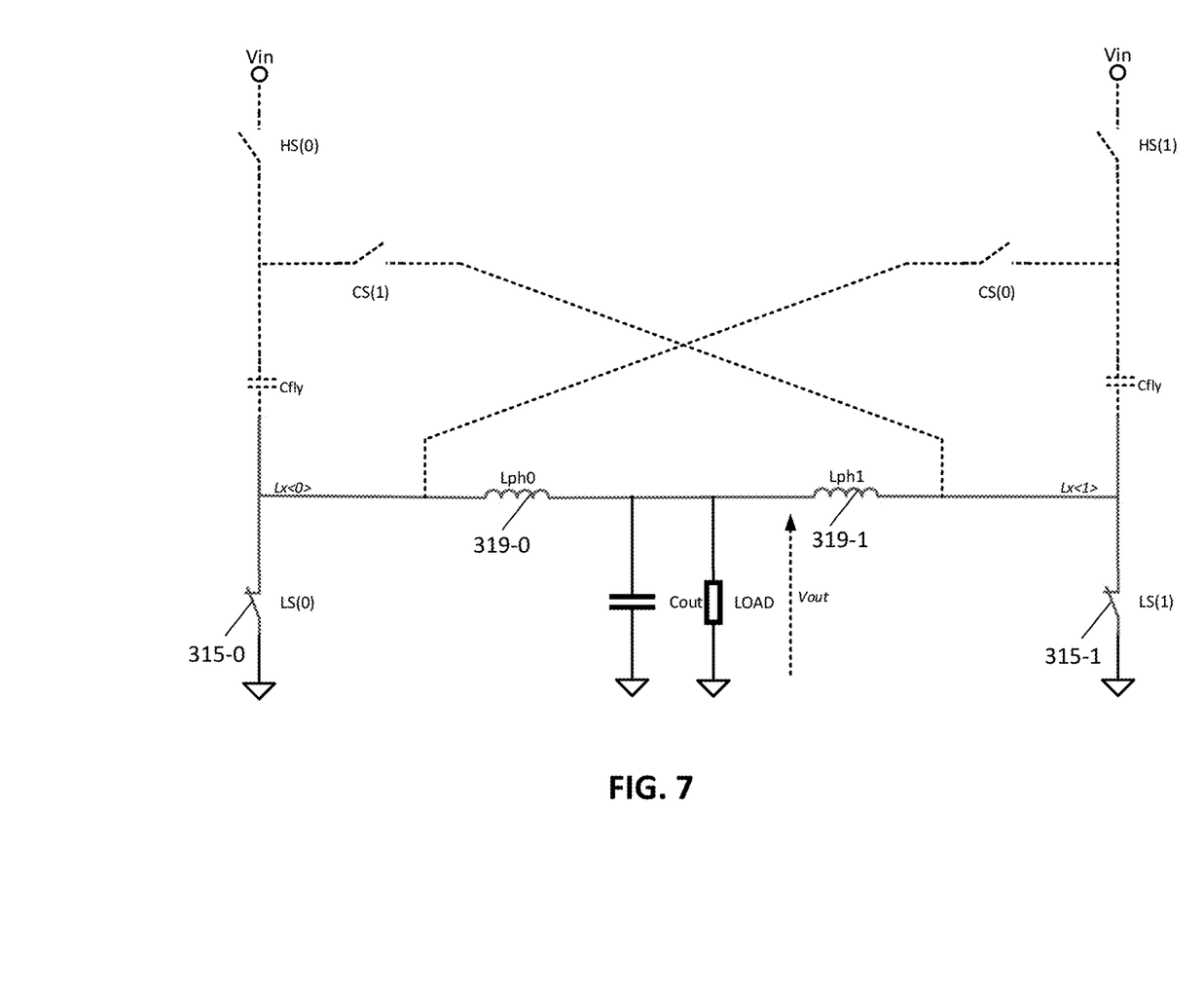

FIG. 5 shows switch states for the "high" portion of phase 0. As may be seen in FIG. 5, a positive plate of the flying capacitor Cfly0 317-0 is coupled to $V_{in}$ by high side switch HS(0) 313-0. A negative plate of the flying capacitor Cfly0 317-0 is coupled to a positive plate of the flying capacitor Cfly1 317-1 (of the other phase) by cross side switch CS(0) 325-0, coupled to the first end of the inductor 319-0, and coupled to ground by the low side switch LS(1) 315-1 (of the other phase). FIG. 6 shows switch states for the "high" portion of phase 1. As may be seen in FIG. 6, a positive plate of the flying capacitor Cfly0 317-0 is coupled to by high side switch HS(0) 313-0. A negative plate of the flying capacitor Cfly0 317-0 is coupled to a positive plate of the flying capacitor Cfly1 317-1 (of the other phase) by cross side switch CS(0) 325-0, coupled to the first end of the inductor 319-0, and coupled to ground by the low side switch LS(1) 315-1 (of the other phase). FIG. 7 shows switch states for the "low" portion of both phases. As may be seen in FIG. 7, the first ends of each of the inductors 319-0, 319-1 are coupled to ground by low side switches 315-0, 315-1, respectively.

Figure 4:
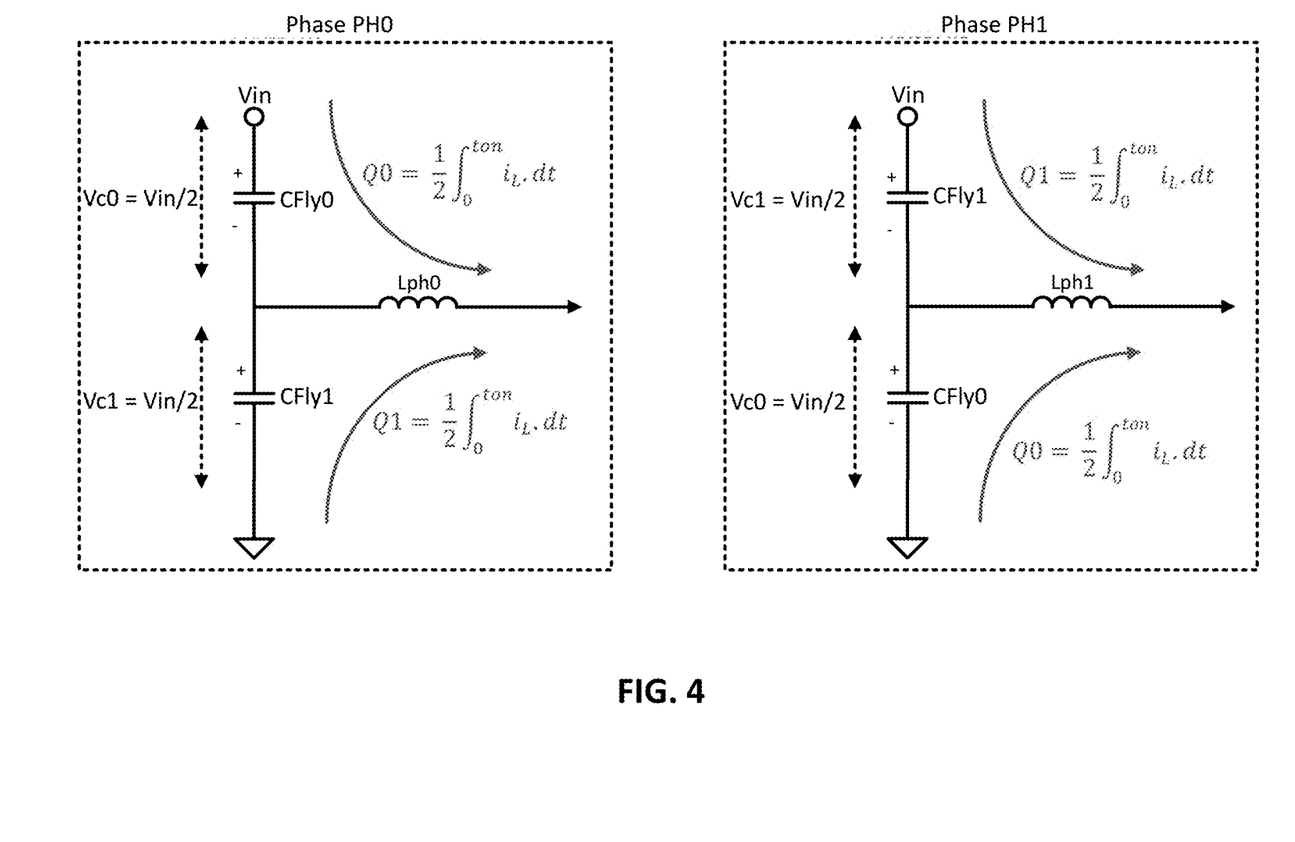
FIG. 4 presents a charge transfer mechanism for the converter of FIG. 3.

The topology may be considered to be based on maintaining a constant voltage Vin/2 across each flying capacitor (Cfly0, Cfly1) and thus limiting the input voltage to the inductor to Vin/2. For each phase, the inductor takes a certain amount of charge $Q=\int_0^{ton} i_L \, dt$ from a different plate of each flying capacitor, for example as shown in FIG. 4. Switching between Vin and ground, Cfly0 and Cfly1 keeps a constant Vin/2 as voltage between their plates.

In some embodiments, a buck converter, for example the buck converter of FIG. 3, in accordance with aspects of the invention has a "high" state for phase 0, a "high" state for phase 1, and a "low" state for both phases. The "high" state for phase 0 is for example illustrated in FIG. 5. During this state, HS(0) and CS(0) are "on" and the inductor Lph0 is being charged with vin/2–Vout across it. The current supplied to Lph0 comes from both Cfly0 and Cfly1, which are in series as shown in phase 1 of FIG. 4. Meanwhile LS (1) is "on" and the current of the inductor Lph1 is discharged through the load.

The "high" state for phase 1 is for example illustrated in FIG. 6. During this state, HS (1) and CS (1) are "on" and the inductor Lph1 is being charged with Vin/2–Vout across it. The current supplied to Lph1 comes from both Cfly0 and Cfly1, which are in series as shown in phase 2 of FIG. 4. Meanwhile LS(0) is "on" and the current of the inductor Lph1 is discharged through the load.

The "low" state for both phases is for example illustrated in FIG. 7. In the low side both LS(0) and LS (1) are "on" and the inductors Lph0 and Lph1 are being discharged through the load.

In some embodiments there is a limit to the duty cycle of this converter because the capacitors Cfly0 and Cfly1 are shared by both inductors; with the limit being 50%. In some embodiments, considering the voltage across the flying capacitors is Vin/2, Voutmax=Vin/4 is a maximum output voltage which can be obtained in the capacitive cross coupled configuration. However, in some embodiments if the output voltage is preferred to go higher than Vin/4, this topology could switch to a basic 2 phase buck converter by having the high side and cross side on at the same time. In that case Vin is directly applied to the inductor and the output voltage can go up to Vin/2.

Figure 8:
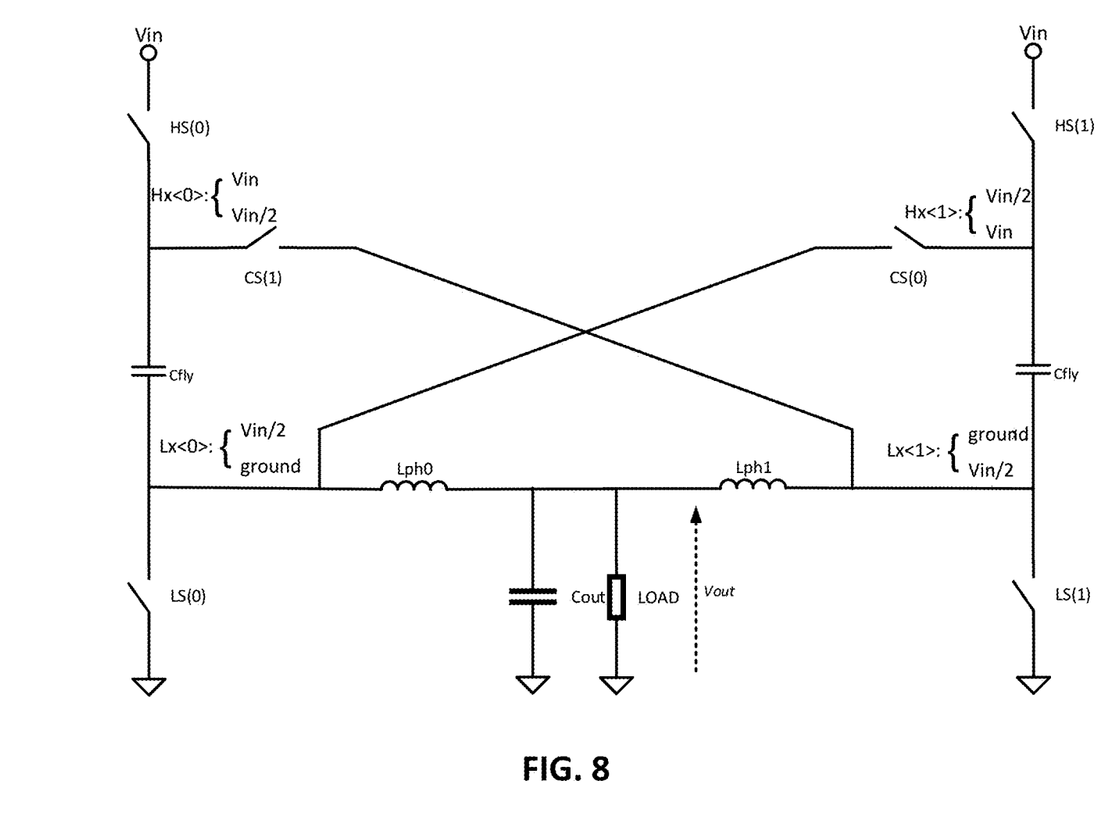
FIG. 8 shows the voltage stress at switching nodes of the converter of FIG. 3.

The topology can work with a variety of existing controls for buck converters, for example since it is equivalent to a basic 2 phase buck converter, which sees a Vin/2 voltage input instead of Vin. FIG. 8 shows the voltage swing at each node of the capacitive cross coupled buck converter. The high sides HS(0), HS (1), and the low sides LS(0), LS (1) will have Vin/2 of drain to source stress across them during steady state, which allows for low voltage devices usage. CS (0) and CS (1) will have a stress of Vin across their drain to source when they are off. They can be implemented with low voltage devices as well but in that case, in some embodiments two (or more) of such devices may be used in series.

Figure 9:
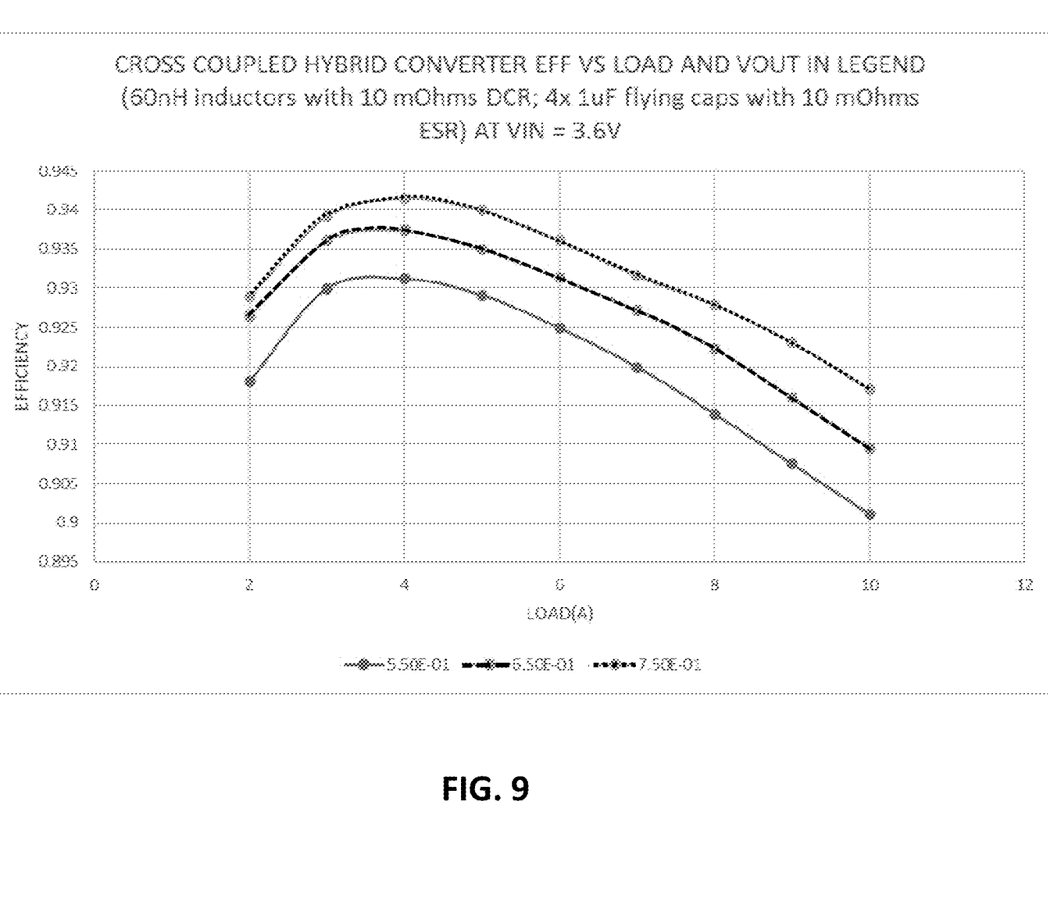
FIG. 9 shows the efficiency obtained with an example of design of a 4 phase converter, comprised of two of the converters of FIG. 3, regulating up to 0.75V at the output with up to 10 A current to the load from a typical battery input voltage of Vin=3.6V.

FIG. 9 shows the efficiency of an example of realization in TSMC 28 nm using 1.8V rated devices. In this realization, a 4 phase buck converter has been simulated. The 4 phase buck converter is comprised of two of the converters of FIG.

3, with the inductors coupled to a common load output capacitor. Because there is only a maximum of Vin/2 stress of the inductors, smaller inductors can be used compared to a basic 2 phases buck; or the proposed topology can be switched 2 times slower for the same inductor current ripple achieved with a typical buck. The flying capacitors used can be very low compared to what is used in a multilevel converter (discussed earlier). For instance, in FIG. 9 the efficiency is shown for 1 uF of each flying capacitor. But even using values such as 100 nF only affect the efficiency by 0.4% at 10 A load. This is because the buck converter is switched at higher frequencies than typical switched capacitors.

Figure 10:
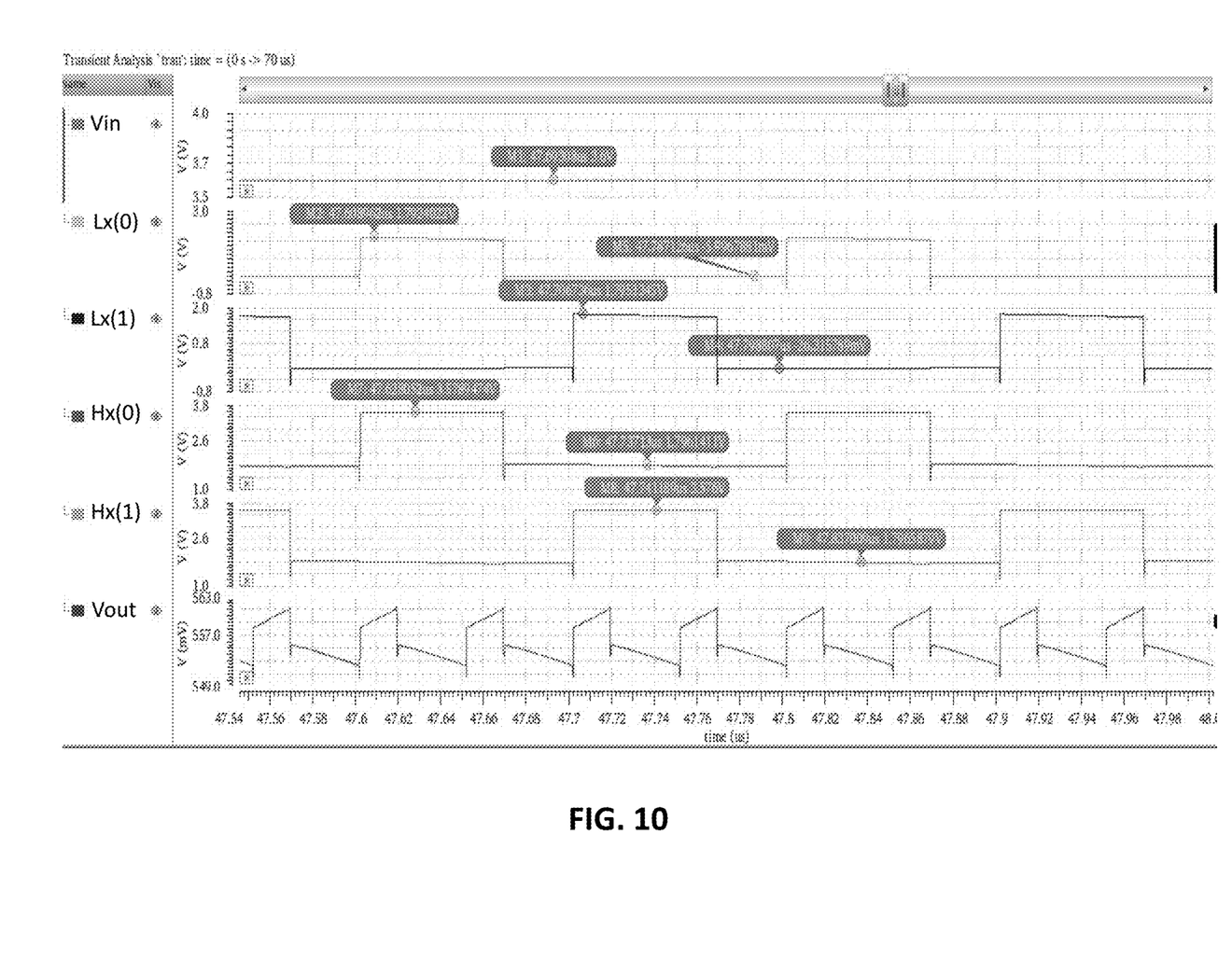
FIG. 10 shows the switching nodes for the example of FIG. 9 with a 3.6V input.

The example of implementation with 3.6V input highlights the switching nodes of the converter (FIG. 10). It can effectively be seen that the maximum voltage on Lx<0> and Lx<1> (inputs to the inductors) is 3.6V/2=1.8V and the output voltage is regulated with minimum ripple to 0.55V targeted voltage. The nodes Hx<0> and Hx<1> (between the high side switches, cross switches, and flying capacitors) are shown as well with a maximum voltage of 3.6V and a minimum voltage of 1.8V.

As comparison to existing topologies, the capacitive cross coupled converter may allow the reduction of voltage stress across the inductor and the switching devices, which leads to high efficiency and smaller inductor compared to a typical buck converter. The capacitive cross coupled converter may also use less switches (same number as a typical buck) compared to multilevel converter, thus reducing die area for the same increase of efficiency. Smaller flying capacitors can be used in some embodiments due to the fast switching in buck converters, so the overall area can be very small compared to both multilevel converters (big flying capacitors) and typical buck converters (bigger inductors requirement).

Although the invention has been discussed with respect to various embodiments, it should be recognized that the invention comprises the novel and non-obvious claims supported by this disclosure.

What is claimed is:

1. A multi-phase buck converter, comprising:
   a plurality of power conversion phases, each power conversion phase comprising a high side switch and a low side switch coupled in series between an input voltage and a lower voltage, a flying capacitor coupled between the high side switch and the low side switch, and an inductor having a first end and a second end, with the first end of the inductor and the low side switch and the flying capacitor coupled to a common node, with the second end of the inductor for each of the power conversion phases coupled to each other and a load and an output capacitor in parallel; and
   a plurality of cross-coupling switches, each cross coupling switch coupling a node between the high side switch and the flying capacitor of one phase to the common node coupling the first end of the inductor and the low side switch and the flying capacitor of another phase.

2. The multi-phase buck converter of claim 1, wherein the plurality of power conversion phases consist of two power conversion phases.

3. The multi-phase buck converter of claim 1, wherein the plurality of power conversion phases consist of four power conversion phases.

4. The multi-phase buck converter of claim 1, wherein the lower voltage is ground.

5. A method of operating a multi-phase buck converter having a plurality of power conversion phases, each of the power conversion phases having a flying capacitor in series between a high side switch and a low side switch, with an inductor having a first end coupled to a node between the flying capacitor and the low side switch and having a second end coupled to a load in parallel to an output capacitor, the method comprising:
   during one time period, coupling the first end of the inductor of one phase with a node between the high side switch and the flying capacitor of another phase; and
   during another time period, not coupling the first end of the inductor of one phase with the node between the high side switch and the flying capacitor of the other phase.

6. The method of claim 5, further comprising, during the other time period, coupling the first end of the inductor of the other phase with a node between the high side switch and the flying capacitor of the first phase.

7. The method of claim 6, wherein the high side switch of the first phase is closed during the one time period and the high side switch of the other phase is open during the one time period.

8. The method of claim 6, wherein the high side switch of the other phase is closed during the other time period and the high side switch of the first phase is open during the one time period.

9. The method of claim 6, further comprising, during yet another time period, not coupling the first end of the inductor of one phase with the node between the high side switch and the flying capacitor of the other phase and not coupling the first end of the inductor of the other phase with the node between the high side switch and the flying capacitor of the one phase.

10. The method of claim 7, wherein the low side switch of the first phase is open during the one time period and the low side switch of the other phase is closed during the one time period.

11. The method of claim 7, wherein the low side switch of the other phase is open during the one time period and the low side switch of the first phase is closed during the one time period.

12. The method of claim 9, wherein the low side switches of the one phase and the other phase are closed during the yet another time period.

13. The method of claim 12, wherein the high side switches of the one phase and the other phase are open during the yet another time period.

* * * * *